(12) United States Patent
Chen et al.

(10) Patent No.: US 11,922,297 B2
(45) Date of Patent: Mar. 5, 2024

(54) EDGE AI ACCELERATOR SERVICE

(71) Applicant: VMware LLC, Palo Alto, CA (US)

(72) Inventors: Tiejun Chen, Beijing (CN); Hong Yue, Beijing (CN); Yinghua Chen, Beijing (CN); Yuxin Kou, Beijing (CN); Shreekanta Das, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 220 days.

(21) Appl. No.: 16/837,385

(22) Filed: Apr. 1, 2020

(65) Prior Publication Data

US 2021/0312271 A1 Oct. 7, 2021

(51) Int. Cl.
| | |
|---|---|
| G06N 3/065 | (2023.01) |
| G06F 9/38 | (2018.01) |
| G06F 13/38 | (2006.01) |
| H04L 43/10 | (2022.01) |
| H04L 45/02 | (2022.01) |

(52) U.S. Cl.
CPC .......... *G06N 3/065* (2023.01); *G06F 9/3877* (2013.01); *G06F 13/382* (2013.01); *H04L 43/10* (2013.01); *H04L 45/026* (2013.01); *G06F 2213/0026* (2013.01); *G06F 2213/0042* (2013.01)

(58) Field of Classification Search
CPC ...... G06N 20/00; G06N 3/063; G06N 3/0454; G06N 3/08; G06N 3/04; G06N 3/0635; G06F 7/5443; G06F 2207/4824; G06F 9/5027; G06F 11/3006; G06F 9/3877; G06F 13/382; G06F 2213/0026; G06F 2213/0042; G06F 9/5072; H04L 67/10; H04L 41/16; H04L 47/781; H04L 43/10; H04L 45/026; H04L 41/0893; H04L 41/5051

See application file for complete search history.

(56) References Cited

U.S. PATENT DOCUMENTS

| | | | | |
|---|---|---|---|---|
| 6,138,183 | A * | 10/2000 | Tien | G06F 13/28 703/23 |
| 10,474,497 | B1 * | 11/2019 | Kancharla | G06F 9/546 |
| 11,037,432 | B1 * | 6/2021 | Shukla | G06N 20/00 |
| 11,188,376 | B1 * | 11/2021 | Alexander | G06F 9/45545 |
| 2005/0027818 | A1 * | 2/2005 | Friedman | H04L 67/1001 709/227 |
| 2005/0223010 | A1 * | 10/2005 | Murray | G06Q 10/10 |
| 2006/0047742 | A1 * | 3/2006 | O'Neill | H04L 67/564 709/203 |
| 2006/0200802 | A1 * | 9/2006 | Mott | G06F 9/544 717/114 |
| 2006/0271681 | A1 * | 11/2006 | Apreutesei | H04L 67/1001 709/226 |
| 2008/0320142 | A1 * | 12/2008 | Hicks | H04L 67/1097 709/231 |

(Continued)

*Primary Examiner* — Faisal M Zaman
(74) *Attorney, Agent, or Firm* — King Intellectual Asset Management (57) ABSTRACT

Disclosed are various examples of providing AI accelerator access as a service at the edge. In some embodiments an artificial intelligence (AI) accelerator device identifier is transmitted to register an AI accelerator with the AI broker service. An AI processing request for the AI accelerator is received from a networked computing device. A bus redirect of the AI accelerator to the networked device is enabled. An AI workload is performed controlled by the networked device through the bus redirect.

20 Claims, 5 Drawing Sheets

(56) References Cited

U.S. PATENT DOCUMENTS

| | | | |
|---|---|---|---|
| 2011/0072234 A1* | 3/2011 | Chinya | G06F 12/121 |
| | | | 711/E12.001 |
| 2013/0124607 A1* | 5/2013 | Griffith | H04L 43/50 |
| | | | 709/203 |
| 2019/0138361 A1* | 5/2019 | Bernat | G06F 9/5005 |
| 2019/0312947 A1* | 10/2019 | Brown | G06F 11/0709 |
| 2019/0339989 A1* | 11/2019 | Liang | G06F 16/907 |
| 2020/0004597 A1* | 1/2020 | Sengupta | G06F 9/5022 |
| 2020/0136906 A1* | 4/2020 | Guim Bernat | G06F 9/5094 |
| 2020/0250525 A1* | 8/2020 | Kumar Addepalli | |
| | | | G06V 10/955 |
| 2020/0265509 A1* | 8/2020 | Kumar Addepalli | |
| | | | G06Q 20/3821 |
| 2020/0410358 A1* | 12/2020 | Ghosh | G06F 7/58 |
| 2021/0081353 A1* | 3/2021 | Eno | G06F 15/781 |
| 2021/0264257 A1* | 8/2021 | Hu | G06F 9/5077 |
| 2022/0198269 A1* | 6/2022 | Canedo | G06F 8/41 |

\* cited by examiner

EDGE AI ACCELERATOR SERVICE

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access.

Machine learning, artificial neural networks, and other artificial intelligence (AI) applications and processes are increasingly being utilized for computations. These AI applications can be performed using a wide variety of specialized AI accelerators. Although AI accelerators can be operated at edge devices, limiting factors including cost, power supply, and physical connection interfaces can result a failure to install sufficient AI accelerators to all edge devices that can utilize them. For example, edge devices, client devices, and IoT devices can have a limited number of physical connection interfaces appropriate for AI accelerators. Some devices have no physical connection interfaces appropriate for AI accelerators. However, the current systems do not provide sufficient network access to AI accelerators by IoT devices, client devices, and edge devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing AI accelerator access as a service at the edge. Machine learning, artificial neural networks, and other artificial intelligence (AI) applications and processes can be utilized for computations made using sensor readings and other aspects of Internet-of-Things (IoT) devices. These AI applications can be performed using a wide variety of specialized AI accelerators. Although AI accelerators can be operated at edge devices, limiting factors including cost, power supply, and physical connection interfaces can result a failure to install sufficient AI accelerators to all edge devices that can utilize them. For example, edge devices, client devices, and IoT devices can have a limited number of physical connection interfaces appropriate for AI accelerators. Some of these devices have no physical connection interfaces appropriate for AI accelerators. The present disclosure describes an infrastructure that can provide edge devices, client devices, and IoT devices access to AI accelerators as a network service. Edge devices can provide an entry point into enterprise networks, client devices and IoT devices can connect to a network through an edge device. IoT devices can be considered client devices or a subset of client devices.

Figure 1:
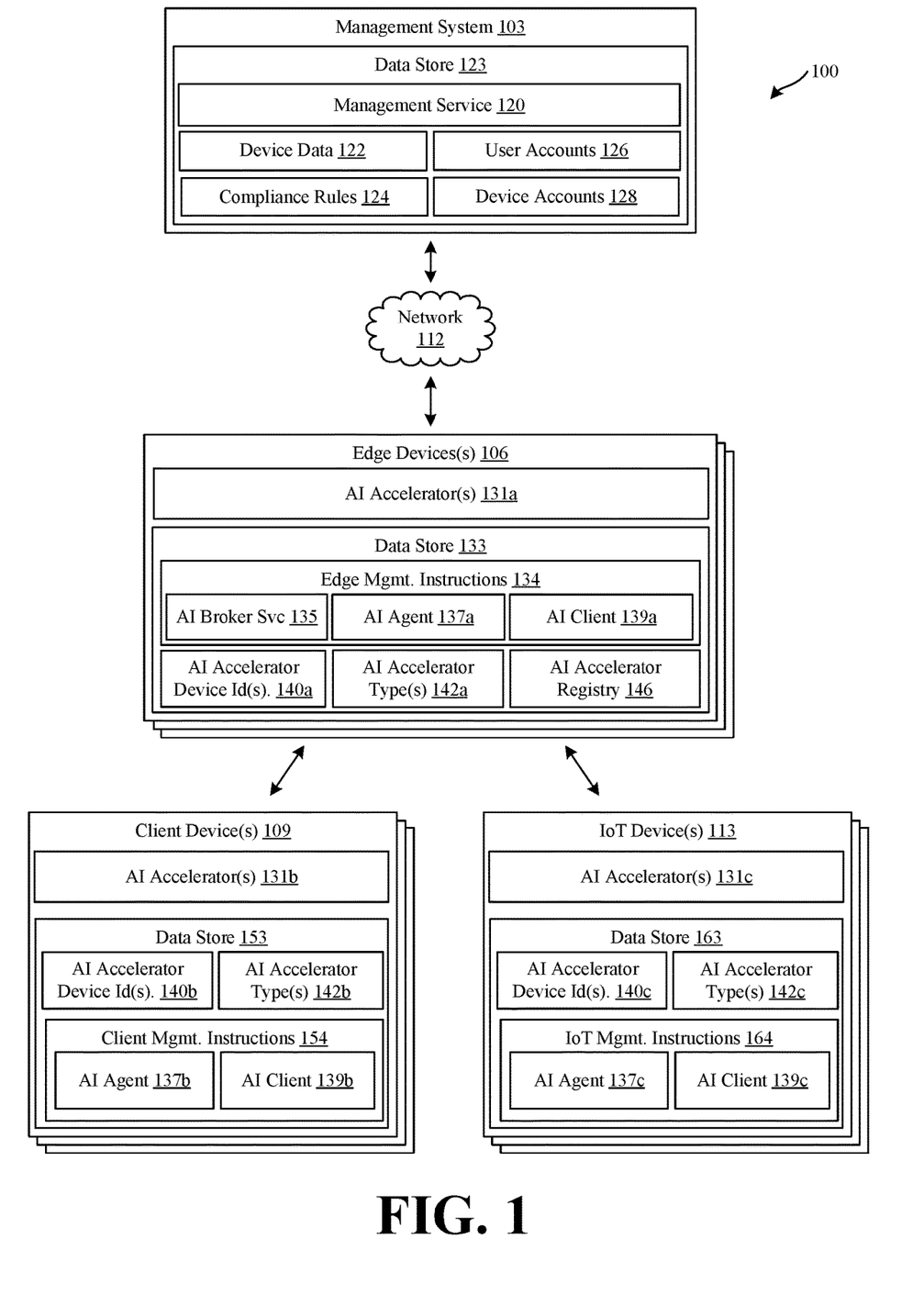
FIG. 1 is a drawing of an example of a networked environment that includes components that provide a framework for AI accelerator processing as a service at the edge.

With reference to FIG. 1, shown is an example of a networked environment 100. The networked environment 100 can include a management system 103, edge devices 106, client devices 109, Internet-of-Things (IoT) devices 113, and other components in communication with one another over a network 112. In some cases, IoT devices 113 and other devices can connect to the network 112 through the edge device 106. The components of the networked environment 100 can be utilized to provide access to AI accelerators 131 as a network service.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. The computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components. The management service 120 can communicate with associated management instructions of the edge devices 106, client devices 109, and IoT devices 113 to ensure that these devices comply with their respective compliance rules 124. If the devices fail to comply with the compliance rules 124, the respective management instructions installed on the edge devices 106, client devices 109, and IoT devices 113 can disable communications with a local intranet provided by one or more of the edge devices 106 and can disable communications with the management services 120.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103.

The data stored in the data store 123 can include management data including device data 122, enterprise data, compliance rules 124, user accounts 126, and device accounts 128, as well as other data. Device data 122 can identify client devices 109, edge devices 106, and IoT devices 113 by one or more device identifiers, a unique device identifier (UDID), a media access control (MAC) address, an internet protocol (IP) address, or another identifier that uniquely identifies a device with respect to other devices. The device identifiers can include a gateway device identifier of an edge device 106 and an IoT device identifier of an IoT device 113. The device data 122 can include an enrollment status indicating whether each client device 109, edge device 106, or IoT device 113 is enrolled with or managed by the management service 120. A client device 109, edge device 106, or IoT device 113 designated as "enrolled" can be permitted to access the enterprise data, while a client device 109, edge device 106, or IoT device 113 designated as "not enrolled," or having no designation, can be denied access to the enterprise data. In some cases, the enrollment of an IoT device 113 can include registering the IoT device 113 with the management service 120. This registration can include storing a device account 128 that includes an IoT type, an IoT device identifier, and IoT capabilities that can be performed by the IoT device 113. Enrollment can indicate that an administrative user has authorized the IoT device 113 to communicate with the management service 120. Enrollment can also indicate that the edge device 106 has been provided with instructions to permit the IoT device 113 to access the network 112 and the management service 120 through the edge device 106. In some cases, enrollment of the IoT device 113 can include installation of a profile that enforces compliance rules 124 on the IoT device 113. A client device 109 and an edge device 106 can be likewise enrolled and registered in association with a respective device account 128 that indicates device type, device identifier, and capabilities that can be performed.

The device data 122 can further include indications of the state of devices including the client devices 109, edge devices 106, and IoT devices 113. For instance, these indications can specify applications that are installed on the client devices 109, edge devices 106, and IoT devices 113, configurations or settings that are applied to each of the devices, user accounts 126, device accounts 128, or service accounts associated with each of the devices, the physical locations of each of the devices, the network to which each of the devices is connected, and other information describing the current state of each of the devices. While a user account 126 can be associated with a particular person, a device account 128 can be unassociated with any particular person, and can nevertheless be utilized for client devices 109, edge devices 106, or IoT devices 113 that provide certain functionalities, such as automatic functionalities. The IoT device 113 can be associated with a service account or a device account 128 that is user unassociated, or not associated with any person. Each of the edge devices 106 can be enrolled with the management service 120 and can be associated with a respective device account 128, such as a gateway account. A device account 128 for an edge device 106 can be referred to as a gateway account. Likewise, each of the IoT devices 113 can be enrolled with the management service 120 and can be associated with a respective device account 128. A device account 128 for an IoT device 113 can be referred to as an IoT device account. A device account 128 for an edge device 106 can be referred to as a gateway device account.

Device data 122 can also include data pertaining to user groups. An administrator can specify one or more of the client devices 109, edge devices 106, and IoT devices 113 as belonging to a user group. The user group can refer to a group of user accounts 126, which can include device accounts 128. User groups can be created by an administrator of the management service 120 such that a batch of client devices 109, edge devices 106, and/or IoT devices 113 can be configured according to common settings. For instance, an enterprise can create a user group for the marketing department and the sales department, where client devices 109, edge devices 106, and/or IoT devices 113 in the marketing department are configured differently from the client devices 109, edge devices 106, and/or IoT devices 113 in the sales department.

Compliance rules 124 can include, for example, configurable criteria that must be satisfied for an enrolled one of the client devices 109, edge devices 106, and IoT devices 113 to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules can also be determined based on a user account 126 associated with a user. In some cases, an edge device 106 can be unassociated with a user, but can nevertheless be associated with a service account, a device account 128, or another user account 126 that is unassociated with a user.

Compliance rules 124 can include predefined constraints that must be met in order for the management service 120, or other applications, to permit edge devices 106, client devices 109, and IoT devices 113 with access to enterprise data and other functions of the management service, as well as connectivity through the edge device 106. The management service 120 can communicate with edge management instructions 134 to determine whether states exist on the edge device 106 that do not satisfy one or more of the compliance rules 124. States can include, for example, a virus or malware being detected on the device; installation or execution of a blacklisted application; and/or a device being "rooted" or "jailbroken," where root access is provided to a user of the device. Additional states can include the presence of particular files, questionable device configurations, vulnerable versions of applications, vulnerable states of the IoT devices 113 or other vulnerability, as can be appreciated.

The management service 120 can communicate with the edge device 106 to determine whether states exist that do not satisfy one or more of the compliance rules 124 regarding the edge device 106 and the IoT devices 113. The IoT device 113 can transmit IoT data, such as sensor data or status data to an upstream target, such as an endpoint of the management service 120, edge device 106, or a datacenter. The endpoint can be an IP address, a URL, or other network address identifier. In some cases, the edge device 106 can receive IoT device 113 communications. The edge device 106 can pass or otherwise transmit the IoT data to the management service 120. IoT device 113 can also transmit status data to the management service 120 for evaluation of the compliance rules. In some cases, the management service 120 can transmit all or a portion of the compliance rules 124 to the edge device 106. The edge device 106 can determine or evaluate whether states exist, for example on the IoT devices 113, that do not satisfy one or more of the compliance rules 124. In any case, determining that states exist in the IoT device 113 that do not satisfy one or more of the compliance rules 124 can trigger the transmission of an action or command that causes the IoT device 113 to be in compliance with the compliance rules 124.

The management service 120 can oversee the management of devices including the client devices 109, edge devices 106, and IoT devices 113. The management service 120 can oversee the operation of the devices enrolled with the management service 120, as well as, enrollment and un-enrollment operations for the devices using the management service 120. The management service 120 can provide functionality using application program interfaces (APIs). To this end, an API of the management service 120 can provide enrollment information regarding a device, such as whether the device is enrolled with the management service 120. The APIs or API calls can be provided for other functionalities of the management service 120 as discussed herein.

The management service 120 can further cause policies and compliance rules 124 to be implemented on the edge device 106 and the IoT devices 113. Policies can include, for example, restrictions or permissions pertaining to capabilities of the IoT device 113. For instance, policies can require certain hardware or software functions of the IoT device 113 to be enabled or to be disabled during a certain time period or based on a particular location. Policies can require IoT data transmitted by the IoT device 113 to be proxied through a particular endpoint of the management system 103 or edge device 106. Policies can be implemented by the IoT management process 165. In some cases, the installation or implementation of an enrollment policy can complete an enrollment of the IoT device 113 with the management service 120. In some cases, the edge device 106 can implement the policies by commands or requests transmitted from the edge device 106 to the IoT device 113.

IoT management instructions 164 can be installed on the IoT device 113, and the IoT management instructions 164 can enforce the policies or compliance rules 124. In some cases, installation of an enrollment policy can complete an enrollment of the IoT device 113. The management service 120 can also transmit various software components to the IoT device 113 which are then installed, configured, or implemented by the IoT management instructions 164. Such software components can include, for example, applications, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period, or when the IoT device 113 is physically located at a particular location.

The management service 120 can transmit various software components to the client device 109 which are then installed, configured, or implemented by the client management instructions 154. Such software components can include, for example, additional applications, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period, or when the client device 109 is physically located at a particular location. Such policies can be implemented by the client management instructions 154.

Edge devices 106 can include gateways, routers, routing switches, integrated access devices (IADs), multiplexers, and local intranet server devices. The edge devices 106 can include edge management instructions 134. Edge management instructions 134 can include instructions that communicate with the management service 120 of the management system 103 through direct communication transmissions as well as command queues for the edge devices 106. In order to communicate with IoT devices 113 that utilize a particular IoT protocol, the edge devices 106 can be configured to include IoT protocol communication instructions, which can enable communications using IoT protocols. IoT protocols can include BacNet, Profinet, Profibus, LoraWAN, ZigBee, ZWave, MQTT, CoAP, and others. Edge management instructions 134 can also include an AI broker service 135, an AI agent 137, and an AI client 139.

The edge device 106 can have locally connected AI accelerators 131a. The accelerators 131a can be connected to the edge device 106 through a universal serial bus (USB) connection, a Peripheral Component Interconnect Express (PCI-e) or mini-PCI-e connection, or another physical connection. AI accelerators 131 can include a hardware accelerator specialized to perform artificial neural networks, machine vision, machine learning, and other types of AI algorithms. AI accelerators 131 can include dedicated application-specific integrated circuits (ASICs), many core processing architectures, and other hardware types. The AI accelerators 131 can utilize in-memory processing, low-precision arithmetic, and other types of techniques. The AI accelerator 131a can be associated with an AI accelerator device identifier 140a and an AI accelerator type 142a. The AI accelerator device identifier 140a can include a unique device identifier of the AI accelerator 131a, which can be assigned by the manufacturer or the management service 120. The AI accelerator type 142a can include a manufacturer identifier, model identifier, a type of AI algorithm, a type of hardware, and a type of technique utilized by the AI accelerator 131a. The AI accelerator device identifier 140a and the AI accelerator type 142a can be stored in the data store 133, which can include a data store or memory of the AI accelerator 131a that is connected to the edge device 106.

The AI accelerator registry 146 can store a record for an AI accelerator 131a that includes or specifies the device to which it is connected, an address to access the AI accelerator 131a, the AI accelerator device identifier 140a, the AI accelerator type 142a, and an availability status. The AI accelerator registry 146 can also specify the device to which the AI accelerator 131 is connected, for example, by a unique device identifier and an address for the edge device 106, the client device 109, or the IoT device 113. The address for the AI accelerator 131 and the device to which it is connected can include a media access control (MAC) address, an internet protocol (IP) address, a transmission control protocol (TCP) address, or another network or hardware address. The availability status can indicate whether the AI accelerator 131a is available or unavailable. The AI accelerator registry 146 can store records for the AI accelerators 131b and 131c along with their respective information.

The AI broker service 135 can function as a master node among nodes comprising the edge devices 106, the client devices 109, and the IoT devices 113. Generally, the AI broker service 135 can be executed on an edge device 106 but can also be executed on client devices 109 and IoT devices 113. The AI broker service 135 can build and maintain an AI accelerator registry 146. The AI accelerator registry 146 can store records for AI accelerators 131 including AI accelerators 131a, 131b, and 131c connected to the edge devices 106, the client devices 109, and the IoT devices 113, respectively. The AI accelerators 131a can be connected to and installed on edge devices 106. The AI accelerators 131b can be connected to and installed on client devices 109. The AI accelerators 131c can be connected to and installed on IoT devices 113.

AI agents 137 including the AI agents 137a, 137b, and 137c can be executed on a variety of devices including the edge devices 106, client devices 109, and the IoT devices 113. AI clients 139 including the AI clients 139a, 139b, and 139c can also be executed on a variety of devices including the edge devices 106, client devices 109, and the IoT devices 113. Generally, the AI agents 137 can be used to request and access AI accelerators 131 remotely, or over a network connection. The AI clients 139 can be used to provide networked access to AI accelerators 131. The AI clients 139 can also report or register the connected AI accelerators 131 with the AI broker service 135. This reporting can be used as a heartbeat that indicates whether a device and its connected AI accelerators 131 are online and available. The AI broker service 135 can maintain the AI accelerator registry 146 and can provide a list of available AI accelerators 131 in response to requests from AI agents 137. The AI agent 137, the AI client 139, and the AI broker service 135 can be considered a distributed application or framework that provides AI accelerator access as a service at the edge when utilized in concert by the components of the networked environment 100.

The AI agent 137a can access remote or networked AI accelerators 131, including the AI accelerators 131b and the AI accelerators 131c, over a network connection. The AI agent 137a can also access local AI accelerators including the AI accelerators 131a. The AI agent 137a can provide the edge device 106, and applications executing thereon, with access to networked AI accelerators 131b and 131c. For example, the AI agent 137a can request networked AI accelerator access by communicating with the AI broker service 135. The AI broker service 135 can return a list of AI accelerators 131 from the AI accelerator registry 146. The AI agent 137a can select one of the AI accelerators 131b or 131c and transmit a processing request to the selected AI accelerator 131 using a bus redirect functionality. The bus redirect can intercept bus traffic intended for an AI accelerator 131 connected to a bus of the local device and redirect this traffic across a network. The local device bus can include a USB, PCI-e bus, or another bus. The redirected AI accelerator 131 can be accessed by applications and instructions of a networked or remote device as if the redirected AI accelerator 131 were locally connected. The bus redirect can include a USB redirect, PCI-e or mini PCI-e bus redirect, and other bus redirects.

In some examples, the AI agent 137a can provide headless redirect functionality, while other examples can provide a graphical user interface. The bus redirect functionality can be provided using the AI agent 137a and the AI client 139 where the selected one of the AI accelerators is connected. The AI agent 137a can establish a bus redirect of the selected one of the AI accelerators and can enable execution of an AI workload over the network 112. The AI agent 137a can also transmit a message or other data indicating that the AI workload is completed.

The AI client 139a can perform actions to provide access to the AI accelerators 131a over a network connection. For example, the AI client 139a can identify locally connected AI accelerators 131a, along with a respective availability status, an AI accelerator device identifier 140a, and an AI accelerator type 142a. The AI client 139a can provide this AI accelerator information to the AI broker service 135 for registration in the AI accelerator registry 146. The AI client 139a can report updated AI accelerator information to the AI broker service 135 periodically, according to a schedule, or in response to detecting a hardware update that includes an AI accelerator 131a. The AI client 139a can also receive an AI processing request for one of the AI accelerators 131a. The AI client 139a can enable bus redirect of the AI accelerator 131a to a remote device such as a client device 109, IoT device 113, or another edge device 106. While the bus redirect is enabled, the AI accelerator 131a can be unavailable to the edge device 106, and the AI client 139a can report an "unavailable" availability status. The AI client 139a can disable bus redirect of the AI accelerator 131a once the AI workload is completed. The AI client 139a can detect that the AI workload is completed based on an activity level of the AI accelerator 131a or can receive a message or other data indicating that the AI workload is completed. In some examples, the AI client 139a can provide headless bus redirect functionality, while other examples can provide a graphical user interface.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute various client applications. The client device 109 can execute the client management instructions 154 to perform or access the functionality described for the management service 120. The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The client device 109 can include locally connected AI accelerators 131b. The AI accelerators 131b can be connected to the client device 109 through a USB connection, a mini PCI-e connection, or another physical connection. Each AI accelerator 131b can be associated with an AI accelerator device identifier 140b and an AI accelerator type 142b. The AI accelerator device identifier 140b can be assigned by the manufacturer or the management service 120. The AI accelerator type 142b can include a manufacturer identifier, model identifier, and a type of AI algorithm performed by the AI accelerator 131b. The AI accelerator device identifier 140b and the AI accelerator type 142b can be stored in the data store 153, which can include a data store or memory of the AI accelerator 131b that is connected to the client device 109.

The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT device 113 can include locally connected AI accelerators 131c. The AI accelerators 131b can be connected to the IoT device 113 through a USB connection, a mini PCI-e connection, or another physical connection. Each AI accelerator 131c can be associated with an AI accelerator device identifier 140c and an AI accelerator type 142c. The AI accelerator device identifier 140c can be assigned by the manufacturer or the management service 120. The AI accelerator type 142c can include a manufacturer identifier, model identifier, and a type of AI algorithm performed by the AI accelerator 131c. The AI accelerator device identifier 140c and the AI accelerator type 142c can be stored in the data store 163, which can include a data store or memory of the AI accelerator 131c that is connected to the IoT device 113.

Figure 2:
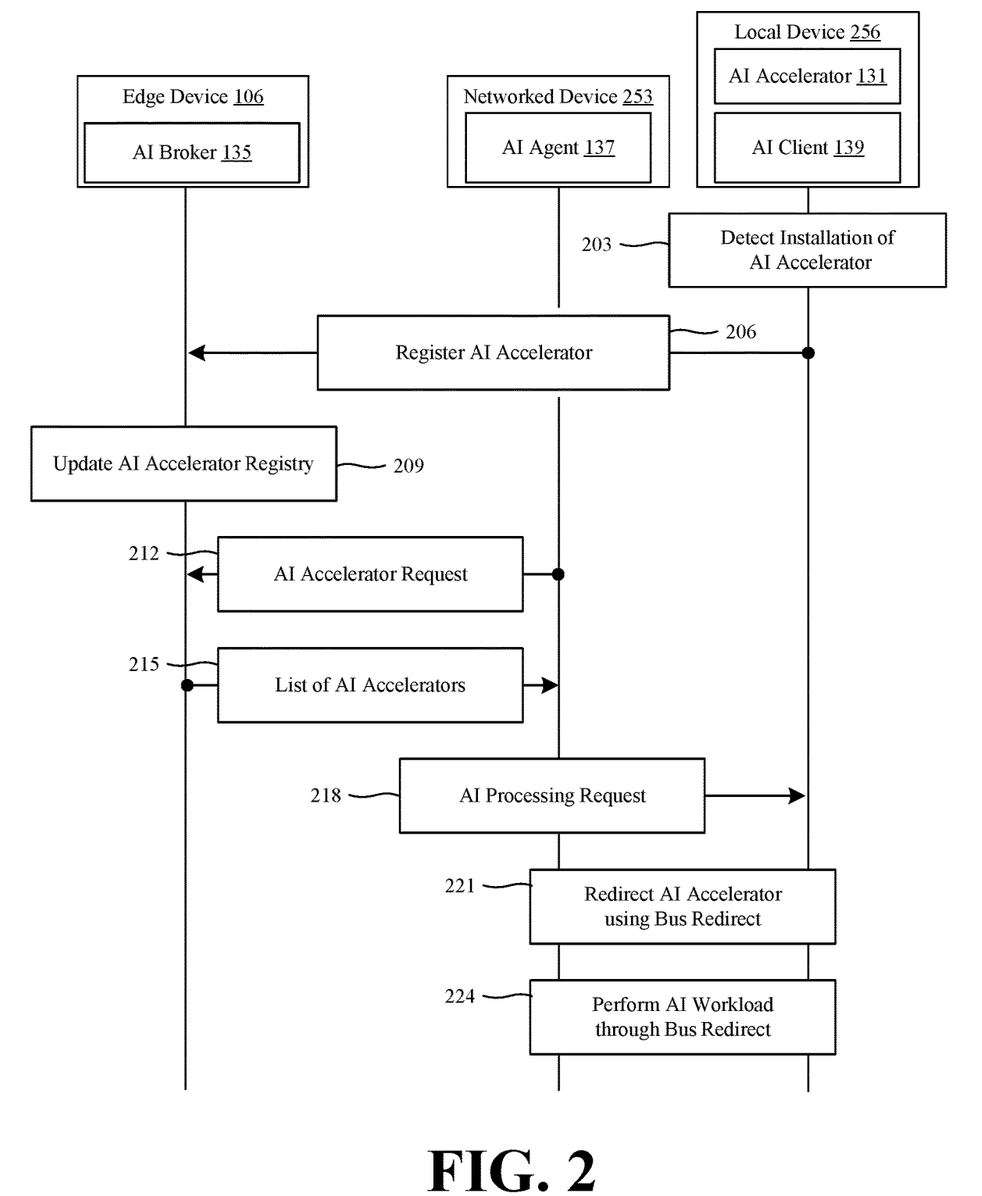
FIG. 2 is a sequence diagram illustrating functionality implemented by components of the networked environment.

FIG. 2 shows a sequence diagram that illustrates steps performed by components of the networked environment 100. Generally, this sequence describes an example implementation of a framework for providing AI accelerator access as a service at the edge. The sequence shows how the components of the networked environment 100 coordinate to provide a networked device 253 with access to an AI accelerator 131 as a network service.

The AI agent 137 can be executing in a networked device 253, while the AI client 139 can be executing in a local device 256. The networked device 253 can refer to any one of the edge devices 106, client devices 109, and IoT devices 113, which has an AI workload to perform. For example, the networked device 253 can be executing instructions or an application that requires a neural networking process, a machine vision process, a machine learning process, or another AI workload. The networked device 253 can be considered networked with respect to the AI accelerator 131. For example, the networked device 253 accesses the AI accelerator 131 over a network 112. The local device 256 can be considered local with respect to the AI accelerator 131. The AI accelerator 131 can be locally or physically connected to the local device 256.

In step 203, the AI client 139 can detect the connection and installation of an AI accelerator 131 on the local device 256. For example, the AI client 139 can monitor the local device 256 to detect a connection or installation of the AI accelerator 131. This can include monitoring an operating system or a list of connected devices of the local device 256 for a known list of AI accelerators 131. The AI client 139 can identify a list of all AI accelerators 131 connected to the local device 256.

In step 206, the AI client 139 can register the AI accelerator 131 with an AI broker service 135. In some examples, the AI broker can be installed in an edge device 106 such as a gateway or an edge server device. In order to register the AI accelerator 131 with an AI broker service 135, the AI client 139 can transmit a list of the AI accelerators 131 that are connected to the local device 256 on which the AI client 139 is installed. The list can specify, for each AI accelerator 131, an availability status, a network or hardware address, an AI accelerator device identifier 140, and an AI accelerator type 142. The list can also include a unique device identifier and an address of the local device 256. The AI accelerator device identifier 140 can include a unique device identifier of the AI accelerator 131. In some cases, the address can be utilized as an AI accelerator device identifier 140. The AI accelerator type 142 can include a manufacturer identifier, model identifier, and a type of AI algorithm performed by the AI accelerator 131.

In step 209, the AI broker service 135 can register or update a record for the AI accelerator 131 in the AI accelerator registry 146. The AI accelerator registry 146 can include records for AI accelerators 131 that are connected to nodes including the local device 256, the networked device 253, and other edge devices 106, client devices 109, and IoT devices 113 on a particular intranet, extranet, WAN, LAN, wired network, wireless network, or other suitable network.

In step 212, the AI agent 137 can transmit an AI accelerator request to the AI broker service 135. The AI accelerator request can be a request for AI accelerators that the AI agent 137, or other instructions executed on the networked device 253, can utilize to perform an AI workload. The AI accelerator request can indicate one or more of a type of AI algorithm, a type of hardware, and a type of technique. In other examples, the AI accelerator request can request all available AI accelerators 131.

In step 215, the AI broker service 135 can access the AI accelerator registry 146 and return a list of AI accelerators 131 to the AI agent 137. In some cases, the AI broker service 135 can return a list that is limited to AI accelerators 131 indicated as available in the AI accelerator registry 146. The list can also be limited to AI accelerators 131 that match the type of AI algorithm, type of hardware, and type of technique that is indicated in the request. The list of AI accelerators 131 can specify an address to access the AI accelerator 131, the AI accelerator device identifier 140, the AI accelerator type 142, an availability status, and a device to which the AI accelerator 131 is connected. The AI broker service 135 can select a particular AI accelerator 131 based on predetermined criteria and can return information for a selected AI accelerator 131. The predetermined criteria can be compared among AI accelerators 131 that match the type of AI algorithm, type of hardware, and type of technique that is indicated in the request. The predetermined criteria can include shortest physical distance, lowest latency, and lowest network utilization for the device to which the AI accelerator 131 is connected, and other criteria.

In step 218, the AI agent 137 can transmit an AI processing request to the local device 256 or AI client 139. Prior to transmitting the request, the AI agent 137 can select one of the AI accelerators 131 based on predetermined criteria as discussed above, or the AI accelerator can be manually or user-selected. The AI processing request can specify the selected AI accelerator 131. The AI processing request can also be considered a bus redirect request that causes a bus redirect of the AI accelerator 131.

In step 221, the AI agent 137 and the AI client 139 can provide access to the AI accelerator 131 by enabling a bus redirect from the local device 256 to the networked device 253. The AI agent 137 and the AI client 139 can facilitate the bus redirect. For example, the AI client 139 can redirect bus traffic intended for the AI accelerator 131 across the network 112. The redirected AI accelerator 131 can appear and be accessed as a USB device or PCI-e device of the networked device 253, rather than the local device 256 to which the AI accelerator 131 is actually connected. The bus redirect can cause the AI accelerator 131 to be accessible to the networked device 253 and inaccessible to the local device 256.

In step 224, the AI agent 137 or other instructions executed on the networked device 253 can control the AI workload through the bus redirect of the AI accelerator 131. As a result, the networked device 253 can control the AI accelerator 131 to perform the AI workload. Once the AI workload is completed, the bus redirect can be disabled by the AI client 139. The bus redirect can be disabled once the AI agent 137 or the AI client 139 indicates that the AI workload is completed.

Figure 3:
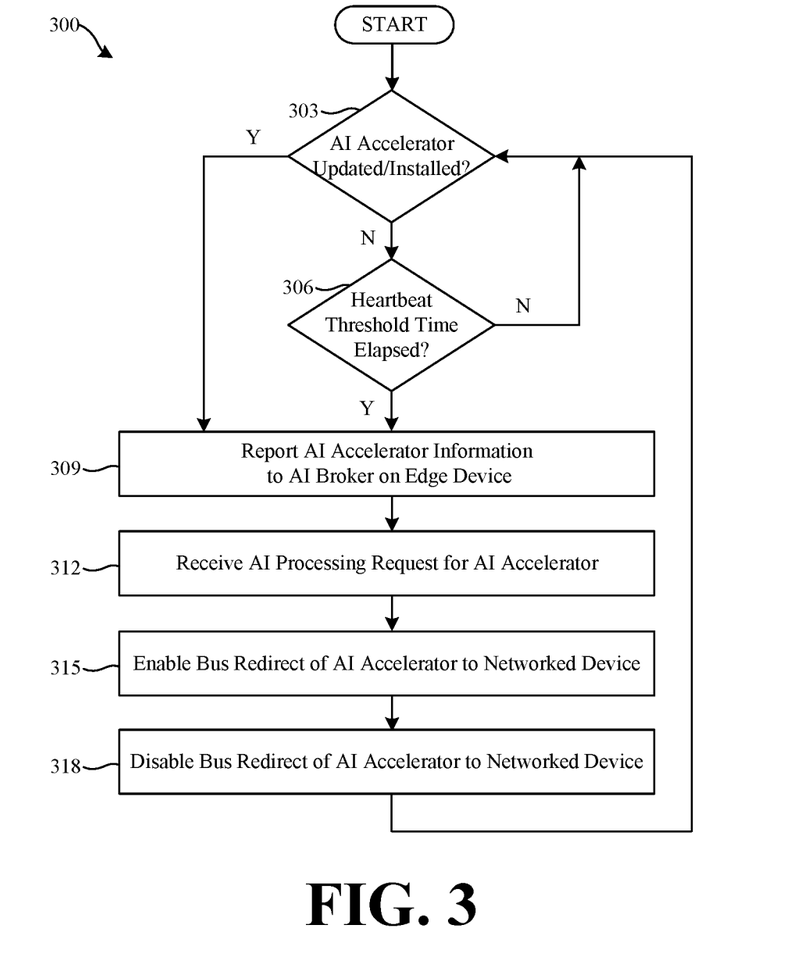
FIG. 3 is a flowchart illustrating functionality implemented by components of the networked environment.

FIG. 3 shows a flowchart 300 that illustrates an example of the operation of the AI client 139. The flowchart 300 describes how the AI client 139 executing on a local device 256 with an AI accelerator 131, coordinates with the other components of the networked environment to provide a networked device 253 with access to an AI accelerator 131 as a network service.

In step 303, the AI client 139 can determine whether an AI accelerator is updated or installed. For example, the AI client 139 can be executed in a local device 256. The AI client 139 can monitor the local device 256 to detect a connection or installation of an AI accelerator 131. This can include monitoring an operating system or a list of connected devices of the local device 256 for a known list of AI accelerators 131. If an AI accelerator 131 has been updated, installed, or connected to the local device 256, the AI client 139 can proceed to step 309. Alternatively, the AI client 139 can save network throughput by proceeding to step 306 and waiting for a period of time before proceeding to step 309. In addition, if no AI accelerator 131 has been updated, installed, or connected to the local device 256, the AI client 139 can proceed to step 306.

In step 306, the AI client 139 can determine whether a heartbeat threshold time has elapsed. If the heartbeat threshold time has elapsed, the AI client 139 can move to step 309. Otherwise, the process can wait or move to step 303 and continue to monitor the local device 265 for updated or newly connected AI accelerators 131.

In step 309, the AI client 139 can report AI accelerator information to an AI broker service 135. The AI broker service 135 can be installed in an edge device 106 such as a gateway or an edge server device. The report can serve as a heartbeat for the AI client 139. If no report is received for a threshold period of time, the AI broker service 135 can consider the AI client 139 and all AI accelerators 131 on the local device 265 to be unavailable. As indicated in step 303, a report can also be transmitted in response to a hardware update that includes installation of an AI accelerator 131. The AI client 139 can transmit a list of the AI accelerators 131 that are connected to the local device 256 on which the AI client 139 is installed. The list can specify, for each AI accelerator 131, an availability status, a network or hardware address, an AI accelerator device identifier 140, and an AI accelerator type 142. The list can also include a unique device identifier and an address of the local device 256. The AI accelerator device identifier 140 can include a unique device identifier of the AI accelerator 131. In some cases, the address can be utilized as an AI accelerator device identifier 140. The AI accelerator type 142 can include a manufacturer identifier, model identifier, and a type of AI algorithm performed by the AI accelerator 131.

In step 312, the AI client 139 can receive an AI processing request from a networked device 253 or an AI agent 137. The AI processing request can specify an AI accelerator 131 that is connected to the local device 256 of the AI client 139. The AI processing request can also be considered a bus redirect request that causes or initiates a bus redirect of the AI accelerator 131.

In step 315, the AI client 139 can provide access to the AI accelerator 131 by enabling a bus redirect from the local device 256 to the networked device 253. The AI client 139 can intercept and redirect bus traffic intended for the AI accelerator 131 across the network 112. The redirected AI accelerator 131 can appear and be accessed as a USB device or PCI-e device of the networked device 253, rather than the local device 256 to which the AI accelerator 131 is actually connected. The bus redirect can cause the AI accelerator 131 to be accessible to the networked device 253 and inaccessible to the local device 256. The AI agent 137 or other instructions executed on the networked device 253 can control the AI workload through the bus redirect of the AI accelerator 131. The AI accelerator 131 connected to the local device 265 can perform the AI workload.

In step 318, the AI client 139 can disable the bus redirect of the AI accelerator 131. The AI client 139 can detect that the AI workload is completed based on an activity level of the AI accelerator 131. The AI client 139 can also receive a message or other data indicating that the AI workload is completed, for example, from the AI agent 137.

Figure 4:
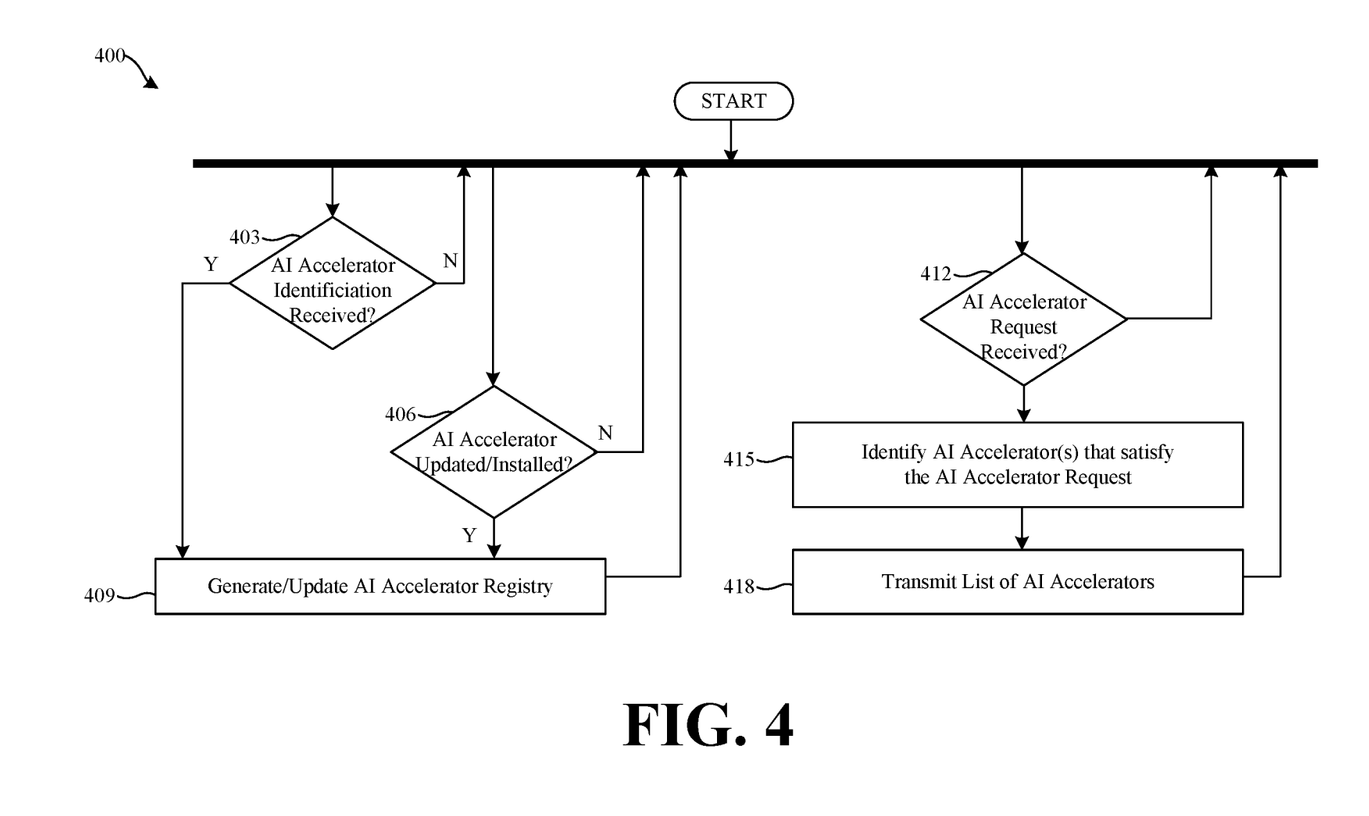
FIG. 4 is a flowchart illustrating functionality implemented by components of the networked environment.

FIG. 4 shows a flowchart 400 that illustrates an example of the operation of the AI broker service 135. The flowchart 400 describes how the AI broker service 135 coordinates with the other components of the networked environment to provide a networked device 253 with access to an AI accelerator 131 as a network service. In this example, the AI broker service 135 can be executing in an edge device 106. Alternatively, the AI broker service 135 can execute in a client device 109 or an IoT device 113.

In step 403, the AI broker service 135 can determine whether an AI accelerator identification is received from a client device 109, an IoT device 113, or another edge device 106. The AI accelerator identification can be received in a report or list of AI accelerators 131 received from an AI client 139 executing on a client device 109, an IoT device 113, or another edge device 106. The list can specify, for each AI accelerator 131, an availability status, a network or hardware address, an AI accelerator device identifier 140, and an AI accelerator type 142. The list can also include a unique device identifier and an address for the AI accelerator 131 and the device to which it is connected. The AI accelerator device identifier 140 can include a unique device identifier of the AI accelerator 131. In some cases, the address can be utilized as an AI accelerator device identifier 140. The AI accelerator type 142 can include a manufacturer identifier, model identifier, and a type of AI algorithm performed by the AI accelerator 131. If an AI accelerator identification is received, the process can proceed to step 409.

In step 406, the AI broker service 135 can determine whether an AI accelerator 131 is updated or installed on the local edge device 106. If an AI accelerator 131 has been updated, installed, or connected locally, the AI broker service 135 can determine its availability status, network or hardware address, AI accelerator device identifier 140, and AI accelerator type 142, and proceed to step 409.

In step 409, the AI broker service 135 can generate or update a record in the AI accelerator registry 146. For example, if a new AI accelerator 131 is identified, then a record of this information can be generated. If an existing AI accelerator 131 is identified, then its record can be updated. In some cases, the update can change the availability status, a network or hardware address, an AI accelerator device identifier 140, and an AI accelerator type 142. In other cases, a check-in time can be updated for that accelerator 131. The AI broker service 135 can compare the current check-in time with a previous check-in time. If a predetermined check-in period has elapsed, then the AI broker service 135 can change an availability status for the AI accelerator 131 to "unavailable."

In step 412, the AI broker service 135 can determine whether an AI accelerator request is received. An AI accelerator request can be received from an AI agent 137 executing on a device that has an AI workload to perform. The device can include a client device 109, an IoT device 113, or another edge device 106. If an AI accelerator request is received, the process can move to step 415.

In step 415, the AI broker service 135 can identify AI accelerators 131 that satisfy the AI accelerator request. The AI broker service 135 can identify AI accelerators 131 that are available and match the type of AI algorithm, type of hardware, and type of technique that is indicated in the request. In some cases, the AI broker service 135 can select a single AI accelerator 131 based on predetermined criteria. The predetermined criteria can be compared among AI accelerators 131 that match the type of AI algorithm, type of hardware, and type of technique that is indicated in the request. The predetermined criteria can include shortest physical distance, lowest latency, lowest network utilization for the device to which the AI accelerator 131 is connected, and other criteria.

In step 418, the AI broker service 135 can transmit a list of AI accelerators 131 to the AI agent 137. The list of AI accelerators 131 can specify an address to access the AI accelerator 131, the AI accelerator device identifier 140, the AI accelerator type 142, an availability status, and a device to which the AI accelerator 131 is connected. In some examples, the list can include a single AI accelerator 131 selected based on predetermined criteria. In other cases, the list can include the AI accelerators 131 that are available and match the type of AI algorithm, type of hardware, and type of technique that is indicated in the AI accelerator request.

Figure 5:
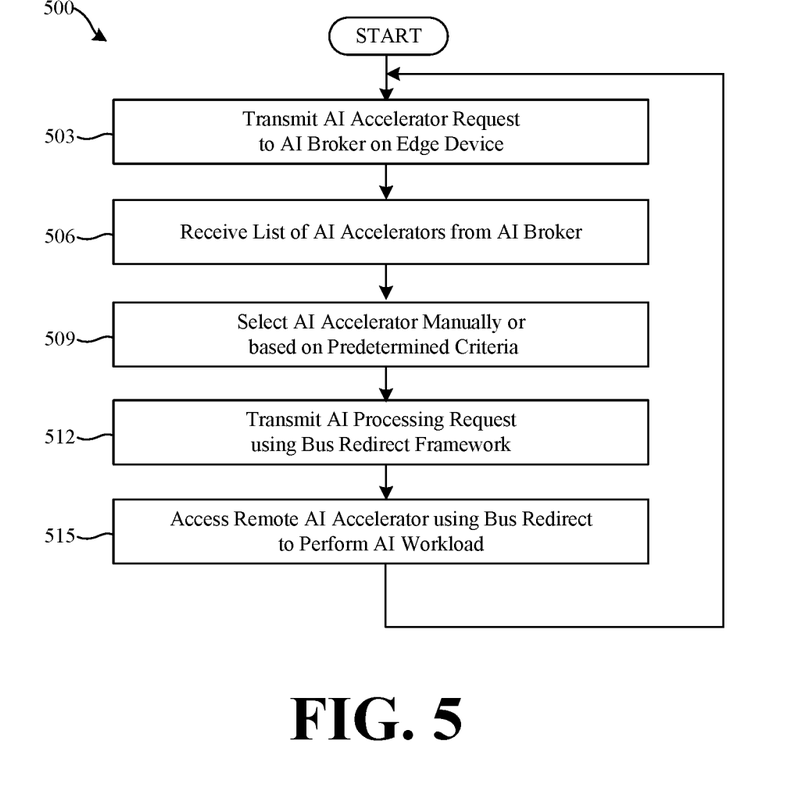
FIG. 5 is a flowchart illustrating functionality implemented by components of the networked environment.

FIG. 5 shows a flowchart 500 that illustrates an example of the operation of AI agent 137 and other instructions executed on a networked device 253. The flowchart 500 describes how the AI agent 137 coordinates with the other components of the networked environment to provide the networked device 253 with access to an AI accelerator 131 as a network service.

In step 503, the AI agent 137 can transmit an AI accelerator request to the AI broker service 135. The AI accelerator request can be a request for AI accelerators that the AI agent 137, or other instructions executed on the networked device 253, can utilize to perform an AI workload. The AI accelerator request can indicate one or more of a type of AI algorithm, a type of hardware, and a type of technique. In other examples, the AI accelerator request can request all available AI accelerators 131.

In step 506, the AI agent 137 can receive a list of AI accelerators 131 from the AI broker service 135. The list can be limited to available AI accelerators 131 that match the type of AI algorithm, type of hardware, and type of technique that is indicated in the request. The list of AI accelerators 131 can specify an address to access the AI accelerator 131, the AI accelerator device identifier 140, the AI accelerator type 142, an availability status, and a device to which the AI accelerator 131 is connected.

In step 509, the AI agent 137 can select a particular AI accelerator 131 manually or based on predetermined criteria and can return information for a selected AI accelerator 131. The predetermined criteria can be compared among AI accelerators 131 that match the type of AI algorithm, type of hardware, and type of technique that is indicated in the request. The predetermined criteria can include lowest network utilization for the device to which the AI accelerator 131, shortest physical distance, lowest latency, and other criteria.

In step 512, the AI agent 137 can transmit an AI processing request to the local device 256 where the selected AI accelerator is connected. The AI processing request can specify the selected AI accelerator 131 and can be directed to an address of the local device 256 or the AI accelerator 131. The AI processing request can also be considered a bus redirect request that causes or initiates a bus redirect of the AI accelerator 131.

In step 515, the AI agent 137 can access the AI accelerator 131 using the bus redirect. The AI client 139 can enable access to the AI accelerator 131 by enabling the bus redirect from the local device 256 to the networked device 253. The AI agent 137 can redirect instructions and other traffic for the AI accelerator 131 to the AI client 139 or otherwise to the local device 256. The redirected AI accelerator 131 can be accessed as a USB device or PCI-e device of the networked device 253, rather than the local device 256 to which the AI accelerator 131 is actually connected. An AI workload can be performed by the redirected AI accelerator 131, as controlled from the networked device 253.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, edge devices 106, client devices 109, and other devices including the management system 103 can include a display upon which the user interfaces can be rendered. The IoT devices 113, edge devices 106, client devices 109, and other devices including the management system 103 can also include one or more input/output devices that can include, for example, a capacitive touchscreen or other type of touch input device, fingerprint reader, or keyboard.

Although the management service 120, edge management instructions 134, and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show are examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts are shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A system, comprising:
at least one computing device comprising at least one processor and a data store; and
the data store comprising executable instructions, wherein the instructions, when executed by the at least one processor, cause the at least one computing device to at least:
transmit, from an artificial intelligence (AI) client to an AI broker service, a plurality of periodically-transmitted AI accelerator heartbeat messages that enable tracking availability statuses for at least one AI accelerator connected to an edge device executing the AI client, wherein an AI accelerator heartbeat message comprises: an AI accelerator device identifier of the AI accelerator, a unique device identifier of the edge device to which the AI accelerator is connected, a hardware address of the AI accelerator, an address of the edge device, and an AI technique type used by the AI accelerator, wherein the AI accelerator heartbeat message registers the AI accelerator with the AI broker service, wherein the AI accelerator is locally connected to a bus of the edge device;
receive, by the AI client from an AI agent executed using a networked computing device, an AI processing request comprising the AI accelerator device identifier of the AI accelerator and the AI technique type, wherein the AI agent selects the AI accelerator for an AI workload based at least in part on the AI accelerator being associated with a shortest physical distance among a plurality of available AI accelerators identified in a list of AI accelerators received from the AI broker service;

enable a bus redirect of the AI accelerator that intercepts bus traffic for the AI accelerator and redirects the bus traffic from the edge device to the networked computing device over a network; and perform, using the AI technique type specified in the AI processing request, the AI workload on the AI accelerator connected to the edge device, the AI accelerator being controlled by the networked computing device using the bus redirect.

2. The system of claim 1, wherein the AI accelerator is connected to the computing device through a USB connection or a mini PCI-e connection.

3. The system of claim 1, wherein the AI accelerator heartbeat message comprises information for the AI accelerator based at least in part on detection of a connection of the AI accelerator to the computing device.

4. The system of claim 1, wherein the AI agent provides a headless redirect functionality.

5. The system of claim 1, wherein the bus redirect comprises a universal serial bus (USB) redirect.

6. The system of claim 1, wherein the AI accelerator is accessible to the networked computing device and inaccessible to the computing device based on the bus redirect.

7. The system of claim 1, wherein the instructions, when executed by the at least one processor, further cause the computing device to at least:

disable the bus redirect of the AI accelerator to the networked computing device, wherein the AI accelerator becomes accessible to the computing device based on the bus redirect being disabled.

8. A non-transitory computer-readable medium comprising executable instructions, wherein the instructions, when executed by at least one processor, cause at least one computing device to at least:

transmit, from an artificial intelligence (AI) client to an AI broker service, a plurality of periodically-transmitted AI accelerator heartbeat messages that enable tracking availability statuses for at least one AI accelerator connected to a local device executing the AI client, wherein an AI accelerator heartbeat message comprises: an AI accelerator device identifier of the AI accelerator, a unique device identifier of the local device, an address of the local device, and an AI technique type used by the AI accelerator, wherein the AI accelerator heartbeat message registers the AI accelerator with the AI broker service, wherein the AI accelerator is locally connected to a bus of the local device;

receive, by the AI client from an AI agent executed using a networked computing device, an AI processing request comprising the AI accelerator device identifier of the AI accelerator and one of the AI algorithm type or the AI technique type, wherein the AI agent selects the AI accelerator for an AI workload based at least in part on the AI accelerator being associated with a shortest physical distance among a plurality of available AI accelerators identified in a list of AI accelerators received from the AI broker service;

enable a bus redirect of the AI accelerator that intercepts bus traffic for the AI accelerator and redirects the bus traffic from the local device to the networked computing device over a network; and perform, using the one of the AI algorithm type or the AI technique type specified in the AI processing request, the AI workload on the AI accelerator connected to the local device, the AI accelerator being controlled by the networked computing device using the bus redirect.

9. The non-transitory computer-readable medium of claim 8, wherein the AI accelerator is connected to the computing device through a USB connection or a mini PCI-e connection.

10. The non-transitory computer-readable medium of claim 8, wherein the AI accelerator heartbeat message comprises information for the AI accelerator based at least in part on detection of a connection of the AI accelerator to the computing device.

11. The non-transitory computer-readable medium of claim 8, wherein the AI agent provides a headless redirect functionality.

12. The non-transitory computer-readable medium of claim 8, wherein the bus redirect comprises a universal serial bus (USB) redirect.

13. The non-transitory computer-readable medium of claim 8, wherein the AI accelerator is accessible to the networked computing device and inaccessible to the computing device based on the bus redirect.

14. The non-transitory computer-readable medium of claim 13, wherein the instructions, when executed by the at least one processor, further cause the computing device to at least:

disable the bus redirect of the AI accelerator to the networked computing device, wherein the AI accelerator becomes accessible to the computing device based on the bus redirect being disabled.

15. A method performed by instructions executed by at least one computing device, the method comprising:

transmitting, from an artificial intelligence (AI) client to an AI broker service, a plurality of periodically-transmitted AI accelerator heartbeat messages that enable tracking availability statuses for at least one AI accelerator connected to a local device executing the AI client, wherein an AI accelerator heartbeat message comprises: an AI accelerator device identifier of the AI accelerator, a unique device identifier of the local device, and an AI technique type used by the AI accelerator, wherein the AI accelerator heartbeat message is registers the AI accelerator with the AI broker service;

receiving, by the AI client from an AI agent executed using a networked computing device, an AI processing request comprising the AI accelerator device identifier of the AI accelerator and the AI algorithm type, wherein the AI agent identifies a selection of the AI accelerator for an AI workload based at least in part on a plurality of available AI accelerators identified in a list of AI accelerators received from the AI broker service;

enabling a bus redirect of the AI accelerator that intercepts bus traffic for the AI accelerator and redirects the bus traffic from the local device to the networked computing device over a network; and performing, using the AI algorithm type specified in the AI processing request, the AI workload on the AI accelerator connected to the local device, the AI accelerator being controlled by the networked computing device using the bus redirect.

16. The method of claim 15, wherein the AI accelerator is connected to the computing device through a USB connection or a mini PCI-e connection.

17. The method of claim 15, wherein the AI accelerator heartbeat message comprises information for the AI accelerator based at least in part on detection of a connection of the AI accelerator to the computing device.

18. The method of claim 15, wherein the AI agent provides a graphical user interface that shows the list of AI accelerators, and the selection of the AI accelerator for the AI workload is identified based at least in part on the graphical user interface.

19. The method of claim 15, wherein the bus redirect comprises a universal serial bus (USB) redirect.

20. The method of claim 15, wherein the AI accelerator is accessible to the networked computing device and inaccessible to the computing device based on the bus redirect.

\* \* \* \* \*